W. H. HEINES.
FURNITURE BUMPER.
APPLICATION FILED MAR. 25, 1915.
1,159,220.
Patented Nov. 2, 1915.
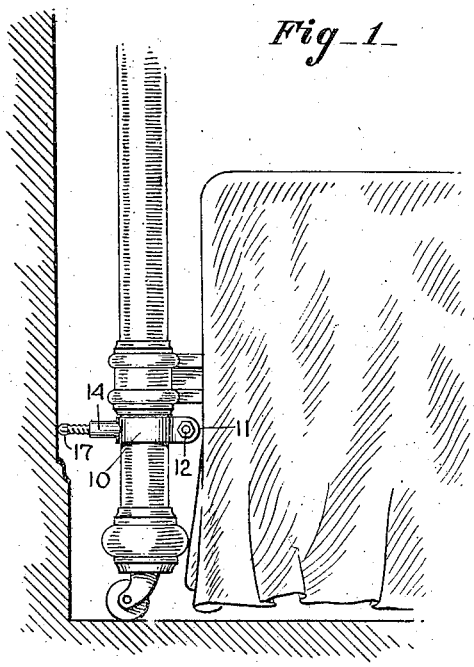
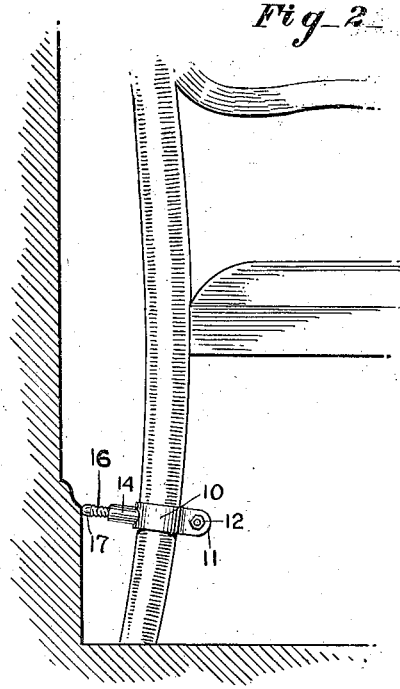
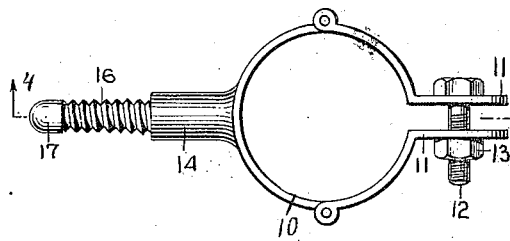
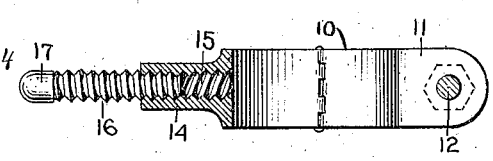
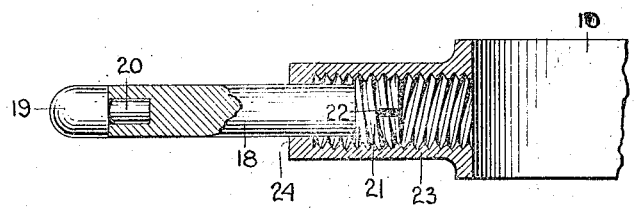
WITNESSES
Frank C. Palmer
INVENTOR
William H. Heines
ATTORNEYS

UNITED STATES PATENT OFFICE.

WILLIAM HENRY HEINES, OF NEW YORK, N. Y.

FURNITURE-BUMPER.

1,159,220.   Specification of Letters Patent.   Patented Nov. 2, 1915.

Application filed March 25, 1915. Serial No. 16,966.

*To all whom it may concern:*

Be it known that I, WILLIAM H. HEINES, a citizen of the United States, and a resident of the city of New York, Richmond Hill, borough of Queens, in the county of Queens and State of New York, have invented a new and Improved Furniture-Bumper, of which the following is a full, clear, and exact description.

Among the principal objects which the present invention has in view are: to prevent articles of furniture from marring the side walls of a building; to provide detachable fixtures of the character mentioned of simplified construction and reduced cost; and to provide means for adjusting the operating condition of bumpers of the character mentioned.

*Drawings.*—Figure 1 is a side elevation of a section of a bedstead having a bumper applied thereto, said bumper being constructed and arranged in accordance with the present invention; Fig. 2 shows a section of a chair having an improved bumper attached to one of the legs thereof; Fig. 3 is a detached view of a bumper constructed and arranged in accordance with the present invention; Fig. 4 is a section taken on the line 4—4 in Fig. 3; Fig. 5 is a detail view on an enlarged scale, showing a modified form of the bumper and the adjusting socket therefor.

*Description.*—As seen in the drawings, the bumper when constructed and arranged in accordance with the present invention, is provided with a resilient clamping ring 10. The ends of the material forming the ring are outturned to form tabs 11, which are perforated in line to permit the extension therethrough of a bolt 12. The bolt 12 has operatively mounted thereon a nut 13, the manipulation of which draws the tabs 11 together and contracts the ring 10. Extending from the ring 10, and preferably at a position opposite the location of the tabs 11, is a boss 14. The boss 14 is rigidly connected to the ring 10, any suitable and conventional method of mounting said boss on said ring being employed. The boss 14 is provided with an internal screw-thread 15 adapted to engage the threads of a wooden screw 16. The screw 16 has secured at the outer end thereof a rubber button 17. The button 17 may be constructed of material other than rubber if desired. It may also be removably mounted on the screw 16, though it is preferred that the union between said screw and said button be made permanent.

It will be understood that the screw 16 may be constructed of metal if so desired. In any event it is preferred that the pitch of the screw shall be what is known as "course," to facilitate and quicken the adjustment of said screw in the boss 14, it being intended that the adjustment shall be effected by turning the screw, using the thumb and finger for this purpose.

In the preferred form shown in Fig. 5 of the drawings there has been substituted for the screw 16 a pintle 18. At the outer end of the pintle 18 a soft button 19 is mounted, said button being provided with a shank 20 to fit a socket formed in the end of the pintle 18. At the opposite extreme of the pintle 18, a screw-threaded section 21 is formed, which is provided with a saw-cut 22 to receive a screw-driver or other tool for turning the screw-threaded section 21 and pintle 18 connected therewith. The saw-cut 22, when the pintle 18 is in adjusted position, normally rests within the socket of a boss 23.

When employing bumpers of the modified construction, it becomes necessary to remove the same from the article of furniture to gain access to the saw-cut 22, whereby the adjustment of the bumper is effected. It will be understood in this connection that the screw-threaded section 21 fits the thread formed in the boss 23 closer than the thread on the screw 16 fits the thread 15 in the boss 14. To guide the pintle 18 the end of the boss 23 is closed by a perforated wall 24, as shown in Fig. 5 of the drawings.

Claims:

1. A furniture bumper comprising a socket member; a clamping ring rigidly attached to said member; a shaft adjustably mounted in said member; and a yielding button mounted on the exposed end of said shaft.

2. A furniture bumper comprising an open-ended socket; a clamping ring rigidly mounted thereon; means for contracting said ring; a shaft mounted in said socket to move lengthwise thereof; means for holding said shaft in adjusted position; and a fender button formed from yielding material, said button being mounted upon the end of said shaft.

3. A furniture bumper comprising a screw-threaded socket; a clamping ring rigidly attached thereto; a screw mounted in, to extend from, said socket; and a yielding fender button mounted on the exposed end of said screw.

4. A furniture bumper comprising a screw-threaded socket; a clamping ring rigidly attached thereto; a screw mounted in, to extend from, said socket; a yielding fender button mounted on the exposed end of said screw; and means for rotating said screw to adjust the operating position of said button, said means being accessible from the inner end of said socket only.

In testimony whereof I have signed my name to this specification in the presence of two subscribing witnesses.

WILLIAM HENRY HEINES.

Witnesses:
F. A. CARTER,
CHAS. C. ILLERS.